July 23, 1963 R. F. THIELMAN 3,098,625
ROCKET MOTOR AND CONTROL SYSTEM
Filed Dec. 19, 1960 6 Sheets-Sheet 3

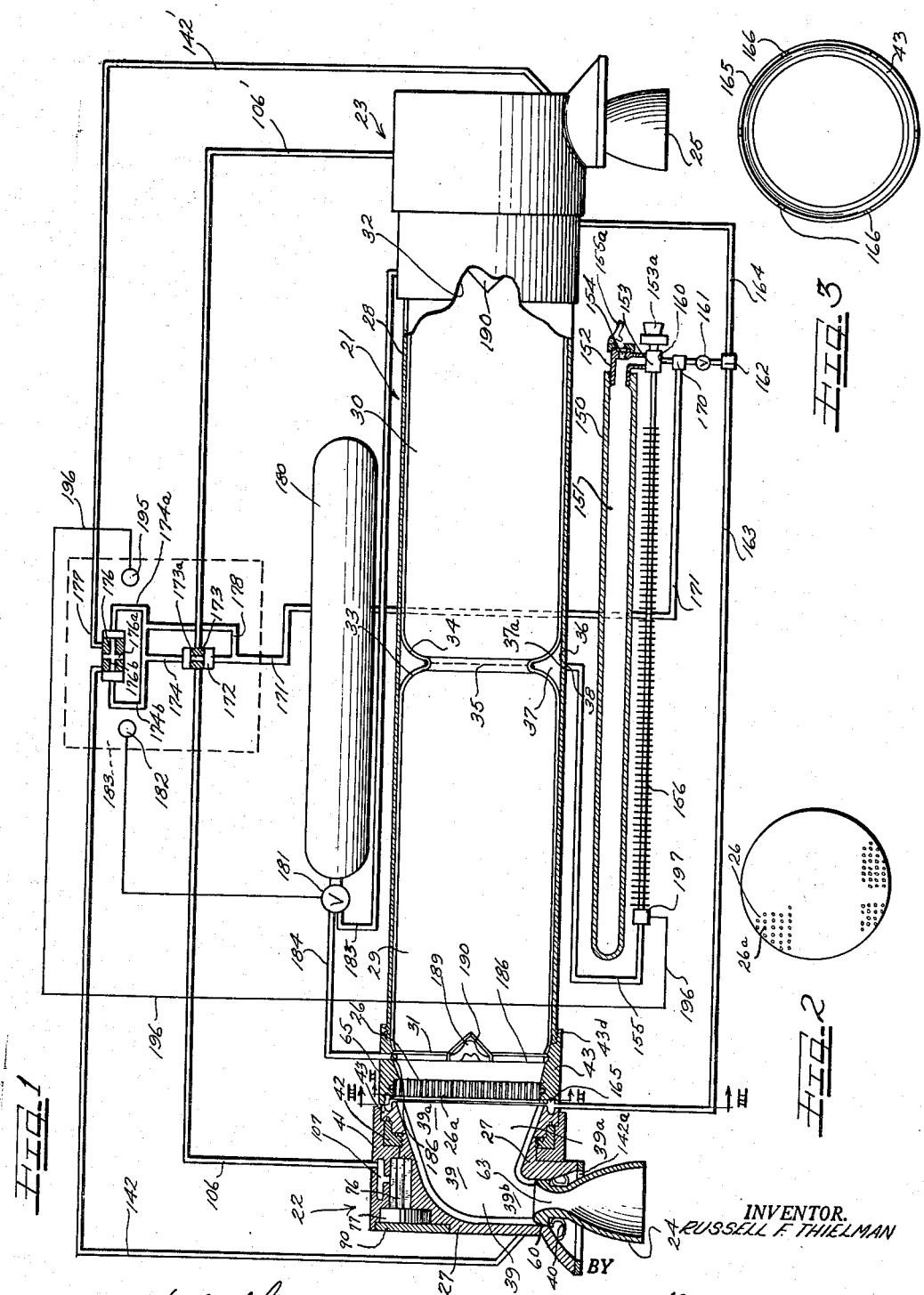

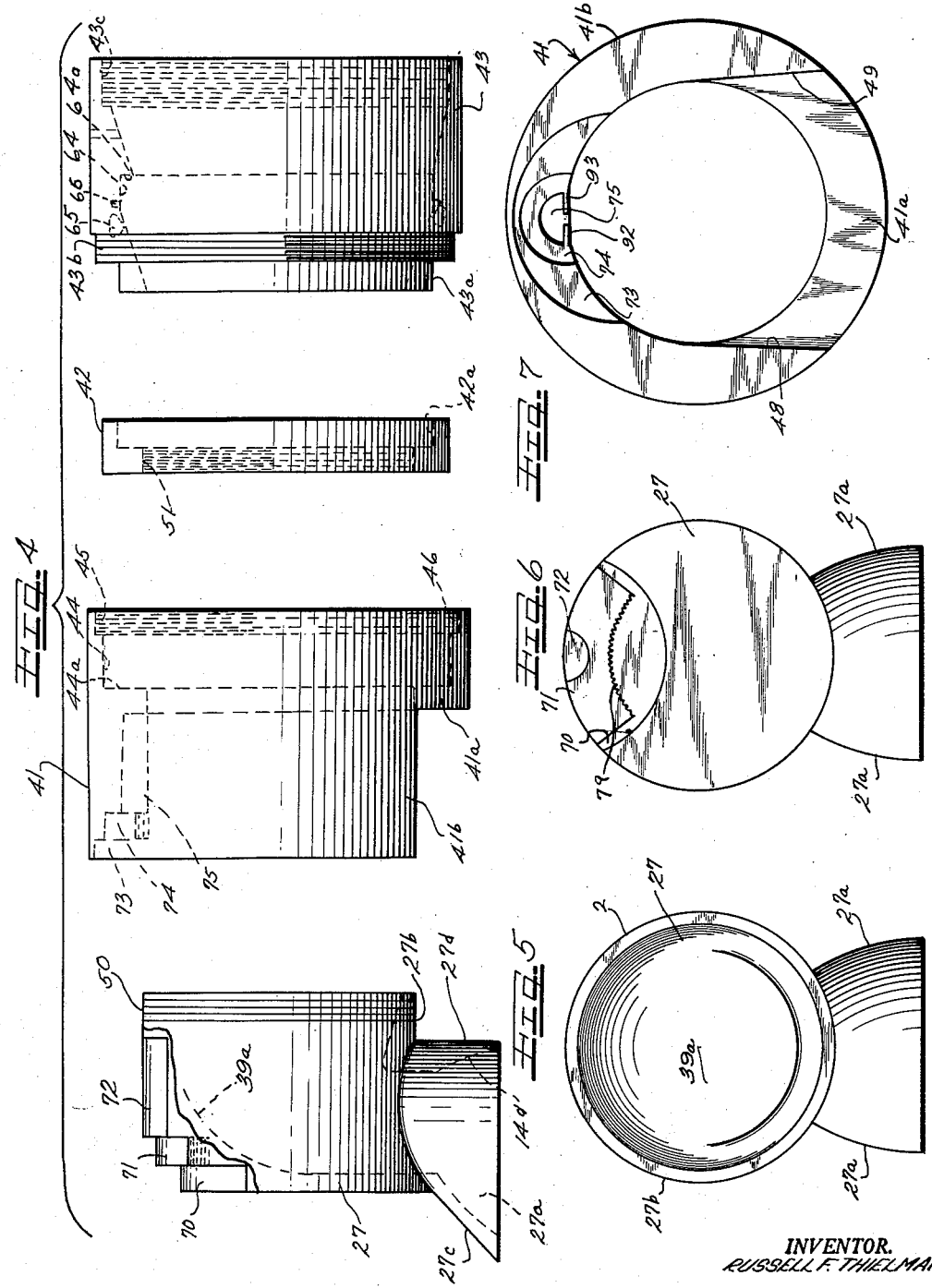

INVENTOR.
RUSSELL F. THIELMAN
BY
Hill, Sherman, Meroni, Gross & Simpson ATTORNEYS

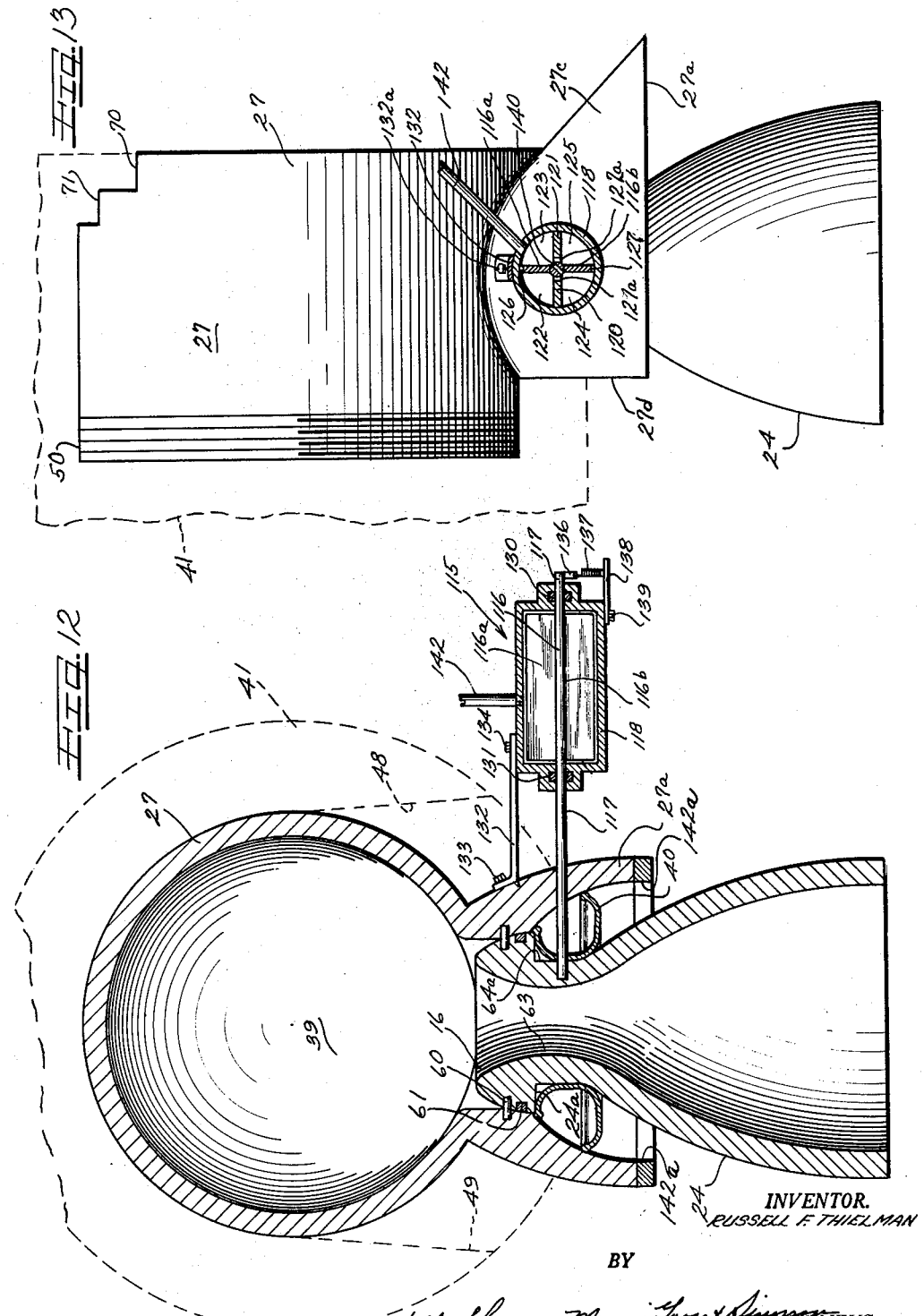

July 23, 1963  R. F. THIELMAN  3,098,625
ROCKET MOTOR AND CONTROL SYSTEM
Filed Dec. 19, 1960  6 Sheets-Sheet 5
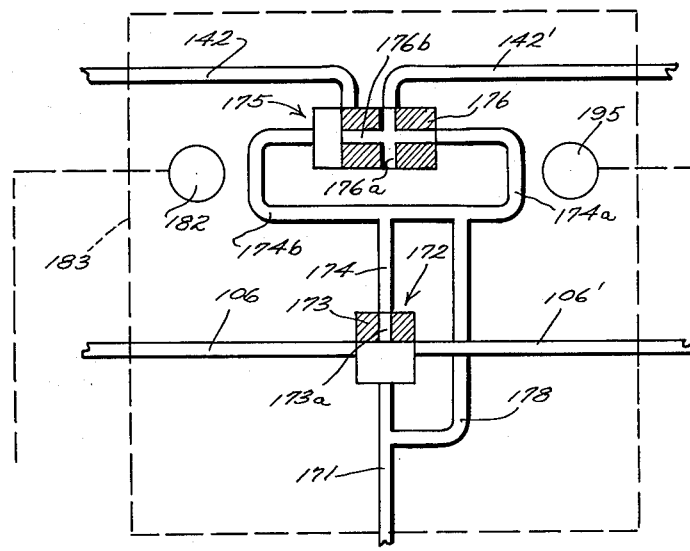
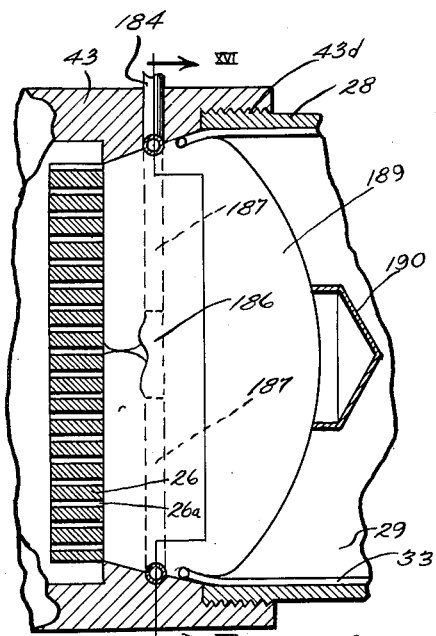
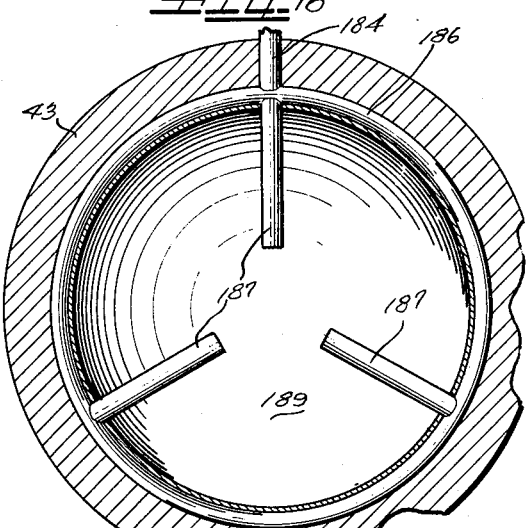
INVENTOR.
RUSSELL F. THIELMAN
BY
Hill, Sherman, Meroni, Gross & Simpson ATTORNEYS July 23, 1963  R. F. THIELMAN  3,098,625
ROCKET MOTOR AND CONTROL SYSTEM
Filed Dec. 19, 1960  6 Sheets-Sheet 6
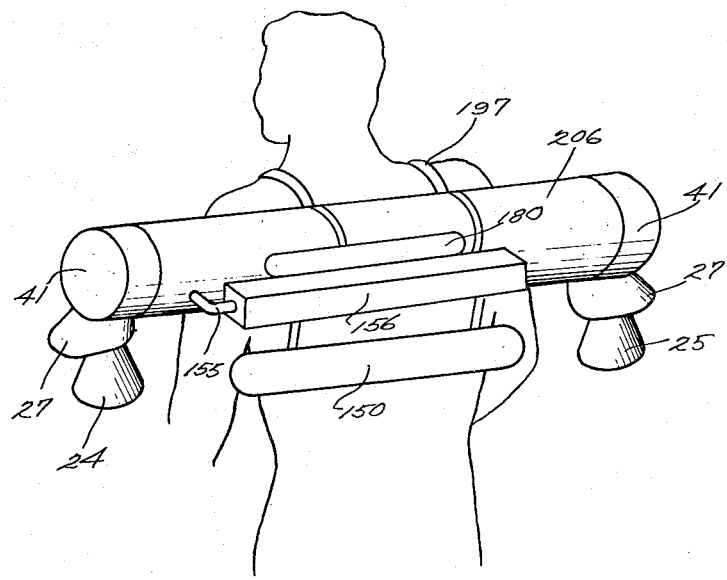
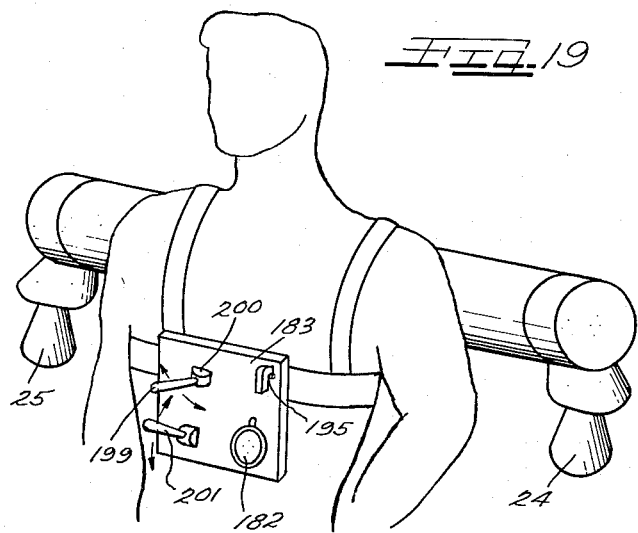
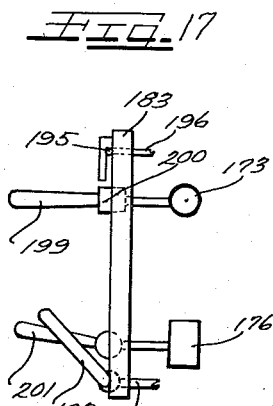
INVENTOR.
RUSSELL F. THIELMAN
BY
Hill, Sherman, Meroni, Gross & Simpson
ATTORNEYS

United States Patent Office

3,098,625
Patented July 23, 1963

3,098,625
ROCKET MOTOR AND CONTROL SYSTEM
Russell F. Thielman, Seven Hills, Ohio, assignor to Thompson Ramo Wooldridge Inc., Cleveland, Ohio, a corporation of Ohio
Filed Dec. 19, 1960, Ser. No. 76,744
9 Claims. (Cl. 244—4)

This invention relates to rockets, missiles and the like, and is more particularly directed to improved methods and means for rendering airborne personnel and materials.

It is an object of the present invention to provide an integrated propulsion and attitude control system capable of rendering airborne a person or material and of maintaining and controlling the attitude of the person or material while airborne.

It is another object of the present invention to provide a propulsion and attitude control system employing a gelatinous monofuel which is extrudable from a common fuel storage tank into the reaction chambers of a pair of reaction motors connected at opposed ends of the fuel tank for providing the lift required to render a person or material airborne.

Still another object of the present invention is the provision of a propulsion and attitude control system wherein reaction motors carried at opposed ends of a fuel tank are swivelably mounted for controlling movement of the fuel tank about its pitch axis and wherein each of the reaction chambers communicates with a gimbaled gas discharge nozzle which is movable within predetermined limits to control movement of the fuel tank about the yaw axis.

It is a further object of the present invention to provide a propulsion and attitude control system for rendering persons and material airborne which includes manually actuatable attitude control means for simultaneously swivelling a pair of reaction motors in the same direction, said motors being operatively connected at opposed ends of an elongated gel fuel storage tank for controlling movement of the fuel tank about its pitch axis, and for selectively moving a gimbaled gas discharge nozzle associated with one or the other of the reaction motors for controlling movement of the fuel tank about its yaw axis.

It is a still further object of the present invention to provide a propulsion and attitude control system for rendering persons or material airborne which includes a common auxiliary gas supply system employing gel monofuels capable of providing means for simultaneously feeding gel monofuel from a fuel tank into the reaction chambers of a pair of reaction motors, one of which is located at each end of the fuel tank, supplying a portion of the gas to each of the reaction chambers to ignite the gel monofuel therein and supplying the pressurizing gas medium for controlling movement of each of the reaction motors and associated gimbaled gas discharge nozzles for controlling the attitude of the person or material being transported by the said system.

It is another object of the present invention to provide thrust termination means for a propulsion and attitude control system powered by gel monofuel wherein an inert pressurizing medium is employed to expand a bladder in the gel fuel tank to terminate flow of fuel from the said tank.

These and other objects, features and advantages of the present invention will become apparent from a consideration of the following detailed description, when considered in conjunction with the accompanying drawings, illustrating a preferred embodiment of the present invention and wherein like reference characters and numerals refer to like and corresponding parts throughout the several views.

On the drawings:

FIGURE 1 is a generally schematic view in partial section of apparatus found useful in the practice of the present invention.

FIGURE 2 is a view taken along lines II—II of FIGURE 1 in front elevation.

FIGURE 3 is a view taken along lines III—III of FIGURE 1 in front elevation.

FIGURE 4 is an exploded view of the components of the reaction motor assemblies of FIGURE 1.

FIGURE 5 is a view in front elevation of the reaction chamber housing of FIGURE 4.

FIGURE 6 is a view in rear elevation of the reaction chamber component of FIGURE 4.

FIGURE 7 is a view in front elevation of the outer housing of the reaction assembly of FIGURE 4.

FIGURE 12 is a cross-sectional view of the reaction motor assembly illustrating the yaw actuator assembly.

FIGURE 13 is a side elevational view in partial section of the reaction motor assembly.

FIGURE 14 is a generally schematic view illustrating the operation of the pitch and yaw control mechanism of the embodiment of the present invention shown in FIGURE 1.

FIGURE 15 is a fragmentary view in partial elevation showing the thrust termination bladder in the inflated condition.

FIGURE 16 is a view taken along lines XVI—XVI of FIGURE 15.

FIGURE 17 is a view illustrating a manual control panel for the system of FIGURE 1.

FIGURE 18 is a rear view of the apparatus of FIGURE 1 as worn by a person.

FIGURE 19 is a front view of the apparatus of FIGURE 19.

As shown on the drawings:

Figure 8:
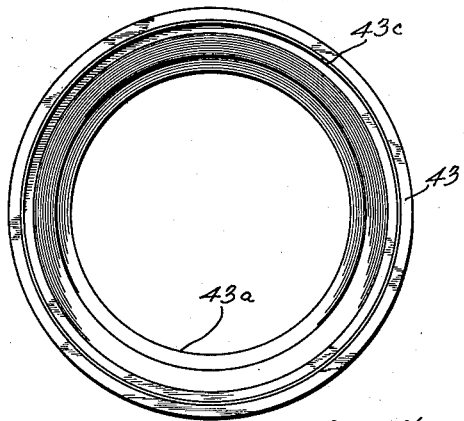
FIGURE 8 is a view in front elevation of the spacer member of FIGURE 4.

Briefly stated, and as appears in FIGURE 1, a preferred embodiment of an integrated propulsion and attitude control system, constructed in accordance with the principles of the present invention and adapted to render airborne persons and material, may include a fuel storage container, generally indicated by the numeral 21, having swivelably connected to each of the opposed ends thereof a reaction motor designated by the numerals 22 and 23 repsectively.

Each of the reaction motors 22 and 23 communicates with a gimbaled gas discharge nozzle 24 and 25 respectively. Since each of the reaction motor assemblies 22 and 23 are identical in operation and construction, the discussion hereinafter will refer to the reaction motor assembly 22 as also representative of the construction and operation of the assembly 23, unless otherwise specified. The reaction chamber of each of the reaction motors 22 and 23 communicate with the fuel tank through fuel injection metering means, such as an apertured flow splitter plate 26 shown associated with the reaction motor assembly 22.

Means are also provided for simultaneously swiveling in unison the inner housing 27 of each of the reaction motor assemblies and in the same direction within predetermined limits for controlling movement of the fuel container about its pitch axis as are means for selectively moving each of the gas discharge nozzles 24 and 25 within predetermined limits for controlling movement of the fuel container about its yaw axis.

As shown in FIGURE 1, manually actuatable pressurizing means are provided including a common gas source for simultaneously controlling supply of fuel under pressure to the reaction motors, operation of the reaction motor swiveling means and the gas discharge nozzle moving means, and ignition of the gel fuel in the reaction motors by gas supplied from the common source. In addition, a novel assembly for terminating flow of fuel from the fuel container to the reaction chambers is also provided.

*Fuel Supply System*

The fuel supply system of the present invention may include an elongated and cylindrical fuel container housing 28, preferably constructed of metal, such as steel or aluminum, which is open at both ends. Positioned in the container housing 28 may be a pair of elongated and collapsible bladders 29 and 30 respectively, each of which contains a gel monofuel. Each of the bladders 29 and 30 is sized to the housing 28, and each bladder has an open end 31 and 32 respectively adjacent the opposed open ends of the housing 28. The opposite and adjacent ends 33 and 34 respectively of each of the bladders 29 and 30 are arcuate and closed. Preferably the bladders are connected together at their closed ends, as indicated by the dotted line 35, and the connected arcuate ends 33 and 34 of the bladders cooperate with the wall 36 of the housing 28 to define an annular space 37 employed for application of a pressurizing medium, such as an inert gas, supplied through an inlet 37a formed in the housing 28 for collapsing both bladders simultaneously to thereby feed fuel from both bladders into the reaction chambers of the reaction motor assemblies 22 and 23 at substantially the same linear flow rate which is at least equal to the fuel burning rate in the respective reaction chambers of the reaction motors to prevent "burn-back" into the fuel bladders.

*Reaction Motor Assemblies*

Each of the reaction chamber assemblies 22 and 23, as represented by the assembly 22, include, as clearly appears in FIGURES 1 and 4, an outer housing 41, an inner reaction chamber housing 27 sized for limited angular movement in the outer housing 41, an apertured spacer member 42 threadably connectable to the inner housing 27 to permit swiveling or rotation of the inner housing in the outer housing, and an apertured sleeve member 43 adapted for connection to both the outer housing 41 and the fuel tank 28 to thereby maintain the outer housing stationary and secure the reaction motor assembly to the fuel tank.

The outer housing 41, as appears in FIGURES 1, 4 and 7 has a generally cylindrical portion 41a and a tunnel portion 41b of reduced diameter. The cylindrical portion 41a is bored, as at 44, to receive the spacer member 42. The cylindrical portion 41a is also counterbored as at 45 and provided with internal threads 46 for securing the outer housing 41 to the sleeve member 43.

The passage of the tunnel portion 41b is sized to the outside diameter of the inner housing member 27 to permit passage therethrough. The divergent inner side walls 48 and 49 of the tunnel portion 41b (FIGURE 7) provide means for limiting the angle of movement of the inner housing 27 whenever the outwardly flared wall portion 27a of the inner housing abuts either of the said side walls. The inner housing 27 defining a reaction chamber 39 including an outwardly flaring tapered portion 39a communicating with a flow splitter 26 and a gas discharge portion 39b communicating with a gimbaled discharge nozzle 24. A resilient retaining member 40 may be employed to movably retain the nozzle 24 in the housing 27.

The inner housing 27 includes the outwardly flared portion 27a defining the gas discharge portion 39b of the reaction chamber and a generally cylindrical portion 27b defining the outwardly flaring reaction chamber portion 39a. The periphery of the inner housing 27 is provided with threads 50 to secure the housing to the spacer member 42 as by the internal threads 51 in the central bore of the spacer member.

The reaction chamber 39, as aforesaid, is defined by the inner housing 27 which terminates in a flanged end 27a having an outwardly flaring arcuate lip 27c and an opposed flat surface 27d so shaped for purposes hereinafter described.

Thus the inner housing 27 is sized for insertion into the tunnel passage of the outer housing 41 and the spacer member 42 sized for insertion in the bore 44 of the outer housing. When assembled, the inner housing is threadably secured to the spacer member, and the spacer member 42 cooperating with the shoulder 44a of the outer housing 41 limits axial movement of the inner housing while permitting rotation thereof about the longitudinal axis of the spacer 42 which is the horizontal axis as shown in FIGURE 4. The spacer member 42 is bored as at 42a to receive a boss 43a of the sleeve member 43. The bore 42a and boss 43a are respectively sized to permit rotation of the sleeve 42 in the outer housing 41.

The generally cylindrical sleeve member 43 with a tapered passage complementary shaped to the outwardly flaring tapered portion 39b of the reaction chamber to facilitate smooth level-rate fuel flow to the reaction chamber is provided with a reduced diameter portion 43b which is externally threaded and sized for insertion in the complementarily threaded counterbore 45 of the outer housing 41 to secure these members. Internally and at its end opposite the boss 43a, the sleeve member 43 is bored as at 43c and the bore defining inner surface threaded for securing the sleeve member and outer housing to the fuel tank 28 as by threads 43d (FIGURE 1).

When assembled, the inner housing 27 is positioned in the tunnel passage in the outer housing 41 and threaded to the spacer member 42 positioned in the bore 44. The outer housing 41 is in threaded engagement with the sleeve member 43 and sleeve member 43 in threaded engagement with the fuel tank housing 28 to maintain the sleeve and outer housing 41 stationary with respect to the fuel tank. The inner housing and spacer member 42 when assembled, are free to rotate within the predetermined limits set by contact of the flanged portion 27a of the inner housing and the walls 48 and 49 of the outer housing and under the influence of the actuator unit of the motor assembly.

As clearly appears in FIGURES 1 and 12, the flared portion 27a of the reaction motor inner housing 27 is bored to receive spring biased pins 60 which are adapted to seat in complementary bores formed in the gas discharge nozzle 24. The U-shaped annular resilient ring member 40 cooperates to movably secure the gas discharge nozzle in the inner housing of the reaction motor. For this purpose the member 40 seats against a shoulder 24a of the gas discharge nozzle and the inner surface of the flared bore of the inner housing. An annular seal 61 of suitable material may be provided to prevent escape of discharge gases between the nozzle and housing.

The nozzle 24 is provided with a venturi throat portion 63 of the De Laval type for discharge of the gases generated in the reaction chamber 39.

*Fuel Injection Metering Arrangement*

As appears in FIGURE 4, the sleeve member 43 is provided with an inner annular stepped portion 64 sized to receive the fuel flow splitter plate 26. The flow splitter is retained in the sleeve member in engagement with the shoulder 64a provided by the annular portion 64 by a retaining ring 65 which seats in an annular groove 66 formed in the sleeve member 43. The flow splitter is provided with a plurality of apertures 26a which may be concentrically arranged in spaced relation as shown in FIGURE 2. The flow splitter plates therefore provides means for metering injection of the fuel from the fuel tank into the reaction chambers.

The gel monofuel may be conventional gel composition capable of extrusion through the flow splitter plate such as that described in the British patent to Hall No. 582,621.

In general the type of fuel found useful in the practice of the present invention includes any monofuel having sufficient coherence to retain its shape in the absence of being subjected to a finite stress under normal operating conditions and capable of assuming flow characteristics when subjected to a finite stress.

Attitude Control System

Figure 9:
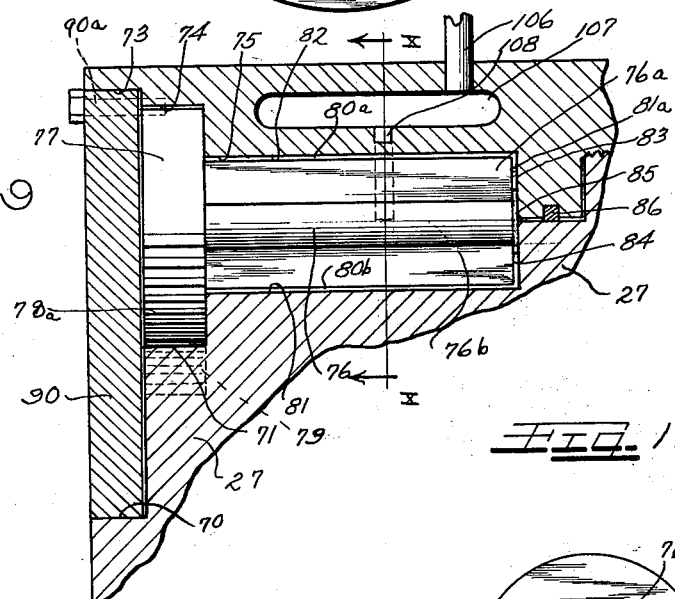
FIGURE 9 is an enlarged fragmentary view of the pitch actuator assembly of FIGURE 1 in longitudinal section.
Figure 11:
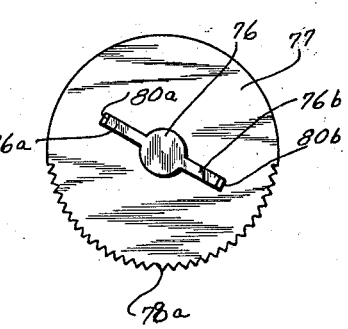
FIGURE 11 is a front elevational view of the vaned rotor of FIGURE 9.

As aforesaid, the attitude control system shown in FIGURE 1 includes the swivelable or rotatable inner housing 27 and sleeve 42 of each of the reaction motor assemblies. As appears in FIGURES 4, 6 and 9 through 11, a portion of the periphery of the inner housing 27 is provided with a plurality of arcuate stepped portions 70, 71 and 72. The outer housing 41 is also provided with complementarily arcuate stepped portions 73, 74 and 75 (FIGURES 4 and 7) sized so that when the inner housing 27 is assembled in the outer housing 41, the arcuate portions 70, 71 and 72 of the inner housing cooperate with the arcuate portions 73, 74 and 75 respectively of the outer housing to define a chamber for receiving a vaned actuator rotor 76 (FIGURES 9 and 11).

The arcuate recess 71 of the inner housing is provided with a plurality of ratchet teeth 79 which cooperate with a plurality of complementary ratchet teeth 78a formed on a portion of the periphery of a generally cylindrical end plate abutment 77 carried by the rotor 76 to thereby cause movement of the inner housing 27.

The rotor 76 includes a pair of diametrically opposed vanes 76a and 76b (FIGURES 9–11) each of which carries along the leading edge thereof a gas leakage seal of preferably inert elastomeric material and generally designated by the numerals 80a and 80b, which are sized for wiping contact with the surface 81 of the inner housing and surface 82 of the outer housing. Each of the seals 80a and 80b has a lateral leg 83 and 84 respectively, which runs radially along the minor surface of the leading edge of each vane and terminates in abutment against an annular seal 85 which circumscribes the rotor shaft adjacent the wall 81a (FIGURE 9) to prevent passage of gas from one vane compartment to the adjacent vane compartment. A seal 86 may also be employed to prevent leakage of gas from the vane compartments.

The rotor 76 carries the generally cylindrical end plate 77 which is sized for oscillation in the chamber defined by the arcuate portion 74 of the outer housing 41 and arcuate portion 71 of the inner housing 27. An annular retaining member 90 may be provided to maintain the rotor 76 in position secured to the housing 41 as by bolts 90a. The abutment 77 is sized to oscillate in the complementary recesses 71 and 74 during oscillation of the rotor and cause movement of the inner housing 27.

When positioned in the chamber defined by the arcuate portions of the inner and outer housing, the vanes 76a and 76b of the rotor cooperate with a pair of generally rectangular members 92 and 93 extending into the chamber, which members may be integrally formed with the housing 41, to define four vane pressurizable compartments 96, 97, 98 and 99. Communication between compartments 97 and 98 is provided by a passage 100 (FIGURE 10) formed in the rotor shaft for purposes more fully hereinafter explained.

Spring means 104 and 105 (FIGURE 10) are connected to each of the vanes 76a and 76b and to the outer housing members 92 and 93 to urge the vanes 76a and 76b in abutment against the members 92 and 93 and to the position shown in FIGURE 11. The spring means 104 and 105 are of sufficient strength to prevent movement of the inner housing 27 when the pitch actuation system is inoperative and thus prevent undesirable changes in thrust direction.

As appears in FIGURES 1 and 9 through 11, a pressurizing medium may be introduced into the inner housing 41 through a conduit 106 into an accumulator chamber 107 which is in communication with an annular passage 108. The annular passage 108 communicates with the vane compartment 97 through a passage 109 and with the vane compartment 98 through the rotor formed passage 100. A bleed passage 110 having a restriction 110a and communicating the vane compartment 97 with the atmosphere is also provided for discharge of the pressurizing medium from the chambers 97 and 98.

Thus swiveling or rotation of the inner housing 27 and spacer member 42 may be effected by action of the pressurizing medium in opposing the force of the spring means 104 and 105 to control movement of the fuel container 28 about its pitch axis.

In operation, the inner housing 27 of each of the reaction motor assemblies is maintained in the position shown in FIGURES 1 and 19 by the spring means 104 and 105 acting to hold the rotor vanes 76a and 76b in contact with the abutment members 92 and 93. Rotation or swiveling of the housing by the contact of the ratchet teeth 78a and 79 (FIGURE 10) may be caused by introducing a pressurizing medium, such as gas, through the conduit 106, chamber 107, passages 108, 109 and 100 which acts against the force of the springs 104 and 105 to move the vanes from contact with members 92 and 93 and to cause movement of the rotor abutment 77 whereby the ratchet teeth 78a moving on the ratchet teeth 79 cause rotation or swiveling of the inner housing 27 of the reaction motor assembly and thus cause movement to counteract and compensate for undesirable pitch movement in the opposite direction about the pitch axis. When the vane compartments 97 and 98 are pressurized, it will be appreciated the vanes 76a and 76b are in the vertical position shown in FIGURE 10.

Figure 10:
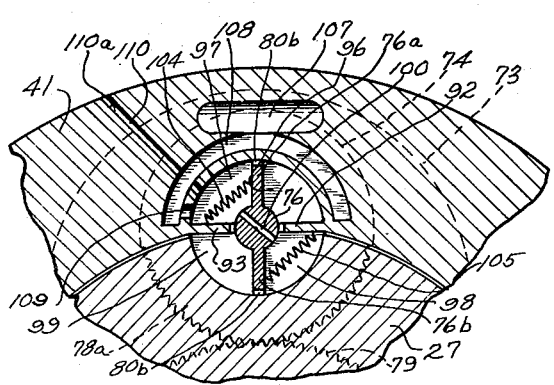
FIGURE 10 is a fragmentary view taken along lines X—X of FIGURE 9.

The pressurizing medium then exhausts through the bleed outlet 110 which may have the fixed restriction 110a therein as shown in FIGURE 10.

If flow of the pressurizing medium is terminated, the pressurizing medium in the vane compartments 97 and 98 will complete discharging through the bleed outlet 110, and the spring means 104 and 105, acting on the vanes of the rotor will return the rotor 76 to the position shown in FIGURE 11 thereby returning the inner housing 27 and spacer member 42 to the positions shown in FIGURES 1 and 19.

Yaw Control Actuation

As appears in FIGURES 12 and 13, yaw control is provided by movement of the gas discharge nozzle 24 by employment of an actuator unit, generally designated by the numeral 115, which includes a rotor 116 having a shaft 117 which extends through the housing 118 of the actuator, through the flared portion 27a of the inner housing and through the retaining member 40 for threaded connection to the nozzle 24 at a position adjacent the venturi throat 63. The rotor 116 carries a pair of diametrically opposed vanes 116a and 116b which cooperate with a pair of partition members 120 and 121 carried by the housing 118 to define four pressurizable vane compartments 122 through 125 (FIGURE 13). Appropriate seals 121a, and 122a are provided to prevent leakage around the rotor shaft from adjacent vane compartments and each of the vanes is provided with a leakage seal 126 and 127 similar in construction and operation to the seals 80a and 80b of the actuator shown in FIGURE 9.

Appropriate conventional bearings 130 and 131 are provided to facilitate oscillation of the rotor 116 in the housing 118. The housing 118 may be supported from the inner housing 27 by a bracket 132 connected thereto as by bolts 133 and 134.

At the end of the shaft 117 remote from the inner housing 27 is provided a projection 136 to which is connected at one end spring means 137. The opposite end of the spring means 137 is connected to a bracket 138 secured as by a bolt 139 to the actuator housing 118. The spring means 137 acts to urge the rotor and vanes to the vertical position as shown in FIGURE 13 whereby the gas discharge nozzle 24 is maintained in axial alignment with the flange portion 27a of the inner housing 27.

The rotor 116 is provided with a passage 140 communicating the vane pressurizable compartments 123 and 124 and a pressurizing medium may be introduced to the vane compartment 123 through an external conduit 142 to urge the rotor vanes against the action of the spring means 137 and to the left as viewed in FIGURE 13 whereby the gas discharge nozzle 24 may be moved to the right to control yaw movement of the fuel tank 21 by compensating for undesired yaw movement in the opposite direction. The gas discharge nozzle 24 will move within the limits provided by the abutment 142a of the inner housing 27 and the inner surface of the wall of the flared portion 27a. Thus, the movement of the gas discharge nozzle may be predetermined within limits to prevent the hazard of application of the discharge gases against the wearer of the propulsion and attitude control system.

Common Thrust and Attitude Control Actuation System

Referring now to FIGURE 1, there is shown pressurizing means for simultaneously controlling supply of fuel under pressure to the reaction motors, swiveling of the reaction motors for pitch control and selectively gimbaling the gas discharge nozzles for yaw control and for ignition of fuel in the reaction motor assemblies.

Such means may take the form of a generally elongated cylindrical fuel container 150 containing a gel monopropellant. The container 150 is closed at one end and has threaded to its opposite open end a fitting 152 which communicates the interior of the container 150 with normally opened valve means 153. Manually actuatable ignition means such as a squib or other pressurizable conventional igniter cartridge 154 may be employed for igniting the gel fuel in the container 150. The manually actuatable ignition means may include a hammer 155a which will ignite a primer charge (not shown) in a conventional manner, which in turn will ignite the gel fuel.

The gases generated in the fitting 152 flow through the normally open valve means 153, and, for purposes of collapsing the bladders 29 and 30 in the fuel container 28, may be connected to the inlet 37a of the fuel container by a conduit 155. In order to reduce the temperature of the gases used for pressurizing the bladders, a heat exchanger 156 of conventional construction may be employed. Thus the gases will pass through the conduit 155 into the annular space 37 in the fuel tank and apply pressure against both bladders 29 and 30 to collapse these bladders and thereby uniformly force the gel fuel from the bladders at substantially the same linear flow rate through the flow splitters 26 into the reaction chambers 39 of the reaction motors 22 and 23.

The valve 153 is also connected through appropriate conduit 160 having a manually actuatable valve 161 therein to a fitting 162 connecting conduits 163 and 164 to an annular passage 165 formed in the sleeve member 43. The annular passage communicates with the combustion chamber 39 of each of the reaction motor assemblies 22 and 23 to a plurality of passages 166, as clearly appears in FIGURE 3, adjacent the flow splitter 26. Thus hot gases may be provided to the combustion chamber for purposes of ignition and maintaining the temperature in the combustion chambers at a level sufficient to promote ignition of the gel fuel being extruded through the flow splitter plates 26.

For purposes of supplying the pressurizing gas to the pitch actuators through the conduits 106 and 106′ (FIGURE 1) a suitable fitting 170 is provided in the conduit 160 adjacent the normally opened valve means 153. The fitting 170 connects conduit 160 with a branch conduit 171 which has connected to its other end conventional valve means 172. The valve means 172 are centrally located with respect to the two reaction motor assemblies 22 and 23 and is connected by suitable fittings to conduits 106 and 106′ for supply of the pressurizing medium to the pitch actuators of the reaction motor assemblies 22 and 23 respectively.

The valve means 172 may comprise a piston 173 normally closing communication between conduits 171 and 106 and 106′. The valve piston 173 is provided with a gas passage 173a communicating the valve means with a conduit 174 leading to the yaw control valve means 175 for supply of the pressurizing medium thereto.

In FIGURE 1 the valve is shown with the piston 173 normally closing conduits 106 and 106′. In FIGURE 14 the valve is shown in the open position permitting flow of gas from line 171 through lines 106 and 106′ to the vane compartments of the pitch actuator unit to thereby cause swiveling or rotation of the reaction motor inner housing 27 of each of the reaction motor assemblies 22 and 23 in synchronized unison. Thus control in the pitch plane of the wearer of the system is provided.

Yaw control is provided by the valve means 175 controlling flow of pressurizing medium to either of conduits 142 or conduit 142′. Valve means 175 include a piston 176 having a transverse passage 176a and an axial passage 176b formed therein. Passage 176b communicates with line 174 through a pair of branch conduits 174b and 174a which are connected at opposite ends of the valve means 175 as shown in FIGURE 1. The piston 176 is sized so that movement thereof to align the passage 176a with either of conduits 142 and 142′ will effectively block the other conduit as appears in FIGURE 14. A by-pass conduit 178 connects conduit 171 and branch conduit 174a so that, if the operator wearing the system is simultaneously adjusting for pitch movement and yaw movement, the pressure drop experienced at the valve means 172 will not affect operation of the valve means 175.

Thus the operator and wearer of the system may move the slide piston 176 to the right as shown in FIGURE 14 and supply the pressurizing medium to the vane compartments of the actuator 115 through conduit 142′ and cause movement of the gimbaled nozzle 25 thereby controlling movement of the fuel tank 28 about its yaw axis. Similarly by moving the piston 176 to the left, the nozzle 24 may be moved to the right and control movement of the fuel tank 21 about its yaw axis. Thus means are provided for selectively controlling yaw movement of the fuel tank 28 and thus the relative position of the wearer of the system.

Thrust Termination System

Referring particularly to FIGURES 1 and 15, a thrust termination system constructed in accordance with the principles of the present invention may include a cylindrical tank 180 containing a pressurizing medium, such as $CO_2$, which is inert and stable with respect to the materials of construction of the bladders 29 and 30. A manually actuatable valve 181 may be operated through linkage 181a by a lever 182 on the control panel, generally designated by the numeral 183, for opening the valve 181 to permit passage of the pressurizing medium through a pair of conduits 184 and 185, each of which communicates with an annular ring conduit, as represented in FIGURE 1 by the numeral 186, which is preferably seated and secured in a groove formed in the sleeve member 43 upstream from the flow splitter 26 a distance sufficient to prevent burning or melting of the bladder. The annular conduit 186 is provided with a plurality of branch conduits 187, three such conduits being shown in FIGURE 16, which are sealed in communication with the interior of a deflated bladder 189 as appears in FIGURES 1 and 16. A thin conical member 190 constructed of material which is inert to the gel monofuel in the bladders 29 and 30 incapsulates the bladder 189 when it is in the deflated position. The member 190 may be supported by the branch conduits 187, if desired.

The thrust termination system then may be actuated by movement of the lever 182 on the control panel to open the valve 181 which permits passage of the gas from the container 180 through the conduits 184 and 185, annular conduit 186, branch conduits 187 into the bladder 189 for expansion thereof. The member 190, being removably secured, is ejected forward into the bladder 29 and the bladder 189 expands to the diameter of the fuel container 28. The back surface of the bladder expands against the flow splitter 26 while the front surface thereof expands against the oncoming monofuel, thus cutting off fuel flow as appears in FIGURE 15.

Simultaneously the normally opened main valve 153 may be closed by rotation of the needle valve 153a by the wearer of the system.

Modulation of fuel flow downstream of the heat exchanger 156 may be controlled by a lever 195 connected to a push-pull flexible cable 196 which may be incased in insulating material if desired. The cable 196 may control a conventional spring loaded poppet valve 197 positioned in conduit 155 with valve positions ranging from full closed to full open.

When the system is to be manually controlled by an operator or wearer, the control panel 183 may be secured to a harness 197 worn by the operator (FIGURES 18 and 19). The control panel 183 (FIGURE 17) includes a handle 199 for operating the pitch control system which may be connected through mechanical linkage to the valve piston 173. The handle 199 may be pivoted on the control panel 183 as at 200 and movement thereof as shown by the arrows operates to open or close the valve means 173. Similarly a manually actuatable lever 201 may be pivotally connected to the panel 183 for moving the valve piston 176 linearly for alignment of the passage 176a with either conduit 142 or 142'. The manually actuatable handle 195 is provided for movement of the flexible cable 196 and thus control of the poppet valve 197 is provided from the control panel 187. A thrust termination handle 182 for operating the valve 181 is also provided in the control panel as shown in FIGURE 18.

In operation, the cartridge hammer 144a is triggered, exploding the squib device 154. The gel fuel 151 in the container 150 is ignited and commences burning. Hot gases flow through the shut-off valve 153 and pass simultaneously through the conduit 155, heat exchanger 156 and thrust modulator 197 into the annular space 37 for collapsing both of the bladders 29 and 30 whereby fuel is extruded through the flow splitter plate 26 into the combustion chamber 29 of each of the reaction motor assemblies 22 and 23. A portion of the gases pass through the conduit 160, manually opened valve 161 and conduit 163 into the annular chamber 165 and the branch conduits 166 for ignition of the gel fuel entering the reaction chambers 39.

After ignition has been established and the temperature in the reaction chamber 39 reaches a level sufficient to support auto-ignition of the gel monofuel, the shutoff valve 161 may be closed, if desired. A portion of the hot gases from the container 150 pass through line 171 into the valve means 172 through the piston formed passage 173a and into lines 174, 174b and 174a, whereby the pressure applied to opposed sides of the piston 176 maintains the piston in the position shown in the FIGURE 1. A portion of the gas in line 171 is by-passed through the conduit 178 for purposes described hereinbefore.

Thrust modulation is manually controlled by the operator through the thrust modulating valve lever 195 and thrust modulating valve 197. Attitude control is accomplished by operation of the levers 199 and 201 which move the pitch and yaw slide valve pistons 173 and 176 as desired.

Thrust termination is achieved by operating the thrust termination lever 182 on the control console panel 183, opening valve 181 to permit supply of the pressurizing medium to the bladder 189 which expanding forces the gel fuel back into the fuel bladders 29 and 30. The thrust termination bladders 189, upon expanding, contact the flow splitter plates 26 and burst due to melting of the bladder material. The inert gas, such as carbon dioxide ($CO_2$) upon bursting of the bladder, enters the flow splitter plate and passes through the reaction chamber 39 and associated gas discharge nozzles 24 to the atmosphere, thereby cooling the reaction motor assembly and reducing the danger of re-ignition of the fuel due to heat flow-back into the bladders 29 and 30. Burning of the gel fuel in the container 150 is terminated by manually opening the gas generator shut-off valve 153 which vents the gas generator to the atmosphere thereby causing termination of burning.

The propulsion and attitude control system may be mounted on a light weight frame 206 and, of course, it will be appreciated, that the length of the assembly is such that the reaction motors are located at a distance from the body and effective arm moving area of the wearer thereof as clearly appears in FIGURES 19 and 20. The frame 206 may be mounted to the body of the wearer by a harness 197 similar to that disclosed in U.S. Patent No. 2,461,347.

Thus it will be appreciated that by employment of the present invention effective means are provided for rendering airborne a person or material and maintaining the attitude of the person or material while in flight.

Although various minor modifications might be suggested to those versed in the art, it is to be understood that I wish to encompass within the scope of the patent warranted hereon all such embodiments as reasonably and properly come within the concepts of the present invention.

I claim as my invention:

1. An integrated propulsion and attitude control system adapted to render persons and material airborne comprising: a reaction motor swiveably connected to each of the opposed ends of a fuel container, each of said motors in communication with a gimbaled gas discharge nozzle; fuel injection metering means communicating the reaction chamber of each of said motors with the fuel container for controlling flow of fuel to the reaction chamber; first means for simultaneously swiveling each of said reaction motors in the same direction and in synchronized unison to control movement of the fuel container about its pitch axis; second means for selectively moving each of the gas discharge nozzles to control movement of the fuel container about its yaw axis; common means for simultaneously controlling supply of fuel under pressure to said reaction motors, each of said first and second means and initation of ignition of fuel in said reaction motors, and means for terminating flow of fuel from said fuel container to said reaction motors.

2. An integrated propulsion and attitude control system adapted to render persons and material airborne comprising: a fuel container carrying a reaction motor at each of the opposed ends thereof, each of said reaction motors being swivelably connected to the fuel container for limited rotation about the longitudinal axis of the fuel container and having a downwardly directed outlet, a discharge nozzle gimbaled to each of the reaction motors for movement about its axis and in communication with the outlet of the reaction motor; fuel injection metering means communicating the reaction chamber of each of said motors with the fuel container for controlling flow of fuel to the reaction chamber; first means for simultaneously swiveling each of said reaction motors in the same direction and in synchronized unison to control movement of the fuel container about its pitch axis; second means for selectively moving each of the gas discharge nozzles for controlling movement of the fuel container about its yaw axis; common means for simultaneously controlling supply of fuel under pressure to said reaction motors, operation of said first and second means and initiation of ignition of fuel in said reaction chambers, and means for terminating flow of fuel from said fuel container.

3. An integrated propulsion and attitude control system adapted to render persons and material airborne comprising: a reaction motor swivelably connected to each of the opposed ends of a gel monofuel container and in communication with a gimbaled gas discharge nozzle; an apertured fuel flow splitter communicating the reaction chamber of each of said motors with the fuel container for controlling flow of fuel to the reaction chambers; first means for simultaneously swiveling each of said reaction motors in the same direction and in synchronized unison to control movement of the fuel container about its pitch axis, said first means including a conduit communicating at opposed ends thereof with a passage inlet formed in each of the reaction motor housings, a vaned rotor actuator assembly in each of the reaction motor housings for swiveling a portion of each of the housings in the same direction and in synchronized unison and in response to a pressure differential created by a pressurizing medium introduced through said inlets acting on the vanes of the rotor, and normally closed valve means in said conduit for preventing flow of the pressurizing medium to the reaction motors; second means for selectively moving each of the gas discharge nozzles for controlling movement of the fuel container about its yaw axis; common means for simultaneously controlling supply of fuel under pressure to said reaction motors, operation of said first and second means and initation of ignition of fuel in said reaction motors, and means for terminating flow of fuel from said fuel container.

4. An integrated propulsion and attitude control system adapted to render persons and material airborne comprising: a reaction motor swivelably connected to each of the opposed ends of an extrudible gel monofuel container and in communication with a gimbal gas discharge nozzle; an apertured fuel flow splitter communicating the reaction chamber of each of said motors with the monofuel container for controlling flow of monofuel to the reaction chamber; first means for simultaneously swiveling each of said reaction motors in the same direction and in synchronized unison to control movement of the monofuel container about its pitch axis; second means for selectively moving each of the gas discharge nozzles for controlling movement of the monofuel container about its yaw axis, said second means including a vaned rotor actuator assembly for each of the reaction motors, means normally urging the rotor to a predetermined position, a shaft on the rotor of each of said actuator assemblies operably connected to the adjacent gas discharge nozzle for gimbaling thereof in response to a pressure differential acting on the vanes of the rotor to rotate said rotor from said predetermined position, conduit means for introducing a pressurizing medium into vane compartments of the actuator assembly, and normally closed valve means for selectively permitting flow of the pressurizing medium to the vane compartments of either of the actuator assemblies; common means for simultaneously controlling supply of monofuel under pressure to said reaction motors, operation of said first and second means and initiation of ignition of monofuel in said reaction motors, and means for terminating flow of monofuel from said fuel container to said reaction motors.

5. An integrated propulsion and attitude control system adapted to render persons and material airborne comprising: a reaction motor swivelably connected to each of the opposed ends of an extrudible gel monofuel container and in communication with a gimbaled gas discharge nozzle; an apertured fuel flow splitter communicating the reaction chamber of each of said motors with the monofuel container for controlling flow of monofuel to the reaction chamber; first means for simultaneously swiveling each of said reaction motors in the same direction and in synchronized unison to control movement of the monofuel container about its pitch axis, second means for selectively moving each of the gas discharge nozzles for controlling movement of the monofuel container about its yaw axis; common means for simultaneously controlling supply of monofuel under pressure to said reaction motors, operation of said first and second means and initiation of ignition of monofuel in said reaction motors, and means for terminating flow of monofuel from said fuel container, said latter means including a source of an inert pressurizing medium, a collapsed expandable bladder positioned between the model and the flow splitter, conduit means communicating the source of inert pressurizing medium and the interior of the bladder, and normally closed valve means actuatable to expand the bladder against the flow of monofuel from the monofuel container to each of the reaction motors whereby the said flow of monofuel is substantially reduced and the said bladder, in contacting the flow splitter, is burst and the inert pressurizing medium thereafter flows through the flow splitter, reaction motor and nozzle for cooling thereof and for preventing burn back of monofuel into the monofuel container.

6. An integrated propulsion and attitude control system adapted to render persons and material airborne comprising: a fuel container including a collapsible bladder adapted to contatin an extrudible gel monofuel and having open and closed ends, a reaction motor swivelably connected to each of the opposed ends of the fuel container and a gimbaled gas discharge nozzle in combination with said reaction motor; an apertured fuel flow splitter communicating the reaction chamber of each of said motors with the monofuel container for controlling flow of monofuel to the reaction chamber; first manually actuatable means for simultaneously swiveling each of said reaction motors in the same direction and in synchronized unison to control movement of the monofuel container about its pitch axis, said first means including a conduit communicating at opposed ends thereof with a passage inlet formed each in each of the reaction motor housings, a vaned rotor actuator assembly in each of the reaction motor housings for swiveling a portion of each housing in synchronized unison and in response to a pressure differential created by a pressurizing medium introduced through said inlet and acting on the vanes of the rotor, and normally closed manually actuatable valve means in said conduit for preventing flow of the pressurizing medium to the reaction motors; second manually actuatable means for selectively moving each of the gas discharge nozzles for controlling movement of the monofuel container about its yaw axis, said second means including a vaned rotor actuator assembly for each of the reaction motors, a shaft on the rotor operably connected for gimbaling the adjacent gas discharged nozzle, condiut means connecting a source of pressurizing medium with the vane compartments defined by the actuator assembly for introducing a pressurizing medium therein to act on the vanes of the rotor and thereby gimbal the connected nozzle, and manually actuatable and normally closed valve means in said conduit for preventing flow of the pressurizing medium to the said vane compartments; common means for simultaneously controlling supply of monofuel under pressure to said reaction motors, operation of said first and second means and initation of ignition of monofuel in said reaction motors, and manually actuatable means for terminating flow of monofuel from said fuel container to said reaction motors.

7. A reaction motor assembly adapted for connection to a monofuel tank comprising: an outer housing adapted to receive an inner reaction chamber defining housing, an inner reaction chamber defining housing sized for limited rotation in the outer housing and having a reaction chamber gas discharge outlet portion, a gas discharge nozzle gimbaled to said chamber outlet portion, a spacer member adapted for connection to the inner housing and sized for rotation within the outer housing, a second chamber defined by the inner and outer housings, when assembled, a vaned rotor actuator assembly in said second chamber for rotating the inner housing relative to the outer housing within predetermined limits in response to a pressure differential acting in said second chamber on the vaned rotor, means normally urge the rotor to a predetermined position, a sleeve carried by the outer housing and said fuel tank, and means for gimbaling said nozzle within limits predetermined by the contour of the said chamber outlet portion.

8. A reaction motor assembly adapted for connection to a fuel tank comprising: an outer housing adapted to receive an inner reaction chamber housing, an inner reaction chamber housing sized for rotation in the outer housing and having a reaction chamber outlet portion, a gas discharge nozzle gimbaled to said chamber outlet portion, a spacer member adapted for connection to the inner housing and sized for rotation therewith in the outer housing, a chamber defined by the inner and outer housings, when assembled, a vaned rotor assembly maintained in said last mentioned chamber for rotating the inner housing in response to a pressure differential acting in said last mentioned chamber on the vaned rotor to thereby rotate the inner housing relative to the outer housing, and means for gimbaling said nozzle within limits predetermined by the contour of said housing outlet portion.

9. In an integrated propulsion and attitude control system adapted to render persons and material airborne including a reaction motor swivelably connected to each of the opposed ends of a fuel container, a gimbaled gas discharge nozzle in communication with each of said motors, fuel injection means communicating the reaction chamber of each of the said motors with the fuel container for controlling flow of fuel to the reaction chamber, first pressure responsive means for simultaneously swiveling each of the reaction motors in the same direction and in synchronized unison to control movement of the fuel container about its pitch axis, second pressure responsive means for selectively moving each of the gas discharge nozzles to control movement of the fuel container about its yaw axis, and means for terminating flow of fuel from said fuel container to said reaction motors, the improvement comprising: a gel monofuel container, means for igniting the monofuel, means for feeding a portion of the gaseous products of monofuel reaction through a heat exchanger, means for feeding the cooled gases for pressurizing the fuel tank, means for bypassing a portion of the gaseous products of reaction to at least one of said reaction chambers to ignite fuel therein, conduit means for bypassing a portion of said reaction gases to said first means, conduit means for bypassing a portion of said reaction gases to said second means, and normally closed valve means for controlling flow of gases to said first and second means.

References Cited in the file of this patent
UNITED STATES PATENTS

| | | |
|---|---|---|
| 2,375,834 | Walker | May 15, 1945 |
| 2,639,582 | Pearlman | May 26, 1953 |
| 2,857,740 | Hall et al. | Oct. 28, 1958 |
| 2,886,281 | Canalizo | May 12, 1959 |
| 2,968,149 | Graham et al. | Jan. 17, 1961 |
| 2,971,097 | Corbett | Feb. 7, 1961 |
| 2,980,177 | Glasson | Apr. 18, 1961 |
| 2,988,879 | Wise | June 20, 1961 |
| 3,001,365 | Kellogg | Sept. 26, 1961 |
| 3,021,095 | Moore | Feb. 13, 1962 |

FOREIGN PATENTS

| | | |
|---|---|---|
| 582,621 | Great Britain | Nov. 22, 1946 |